United States Patent [19]

Yokota

[11] Patent Number: 4,477,172

[45] Date of Patent: Oct. 16, 1984

[54] LIGHT MEASURING DEVICE FOR CAMERA

[75] Inventor: Hideo Yokota, Kanagawa, Japan

[73] Assignee: Canon Kabushiki Kaisha, Tokyo, Japan

[21] Appl. No.: 403,337

[22] Filed: Jul. 30, 1982

[30] Foreign Application Priority Data

Aug. 8, 1981 [JP] Japan ................. 56-124214

[51] Int. Cl.³ ............ G03B 7/099; G03B 17/20; G02B 5/04
[52] U.S. Cl. ...................... 354/480; 354/481; 354/482; 354/289.1; 250/237 R; 350/314; 350/315; 350/286
[58] Field of Search ............ 354/23 R, 53–56, 354/59, 49, 42, 60 R, 289.1, 471, 480, 481, 482; 350/167, 280, 287, 314, 315, 317, 318, 168; 250/237 R; 356/221, 224, 225

[56] References Cited

U.S. PATENT DOCUMENTS

| | | | |
|---|---|---|---|
| 3,536,408 | 10/1970 | Norwood | 354/59 X |
| 3,575,095 | 4/1971 | Keck | 354/56 |
| 3,612,703 | 10/1971 | Irisawa | 354/56 X |
| 4,180,312 | 12/1979 | Schmidt et al. | 354/59 |
| 4,277,156 | 7/1981 | Fukushima et al. | 354/25 |

FOREIGN PATENT DOCUMENTS 55-95934  7/1980  Japan .................. 354/60 R

Primary Examiner—William B. Perkey
Attorney, Agent, or Firm—Toren, McGeady and Stanger

[57] ABSTRACT

A light measuring device for cameras with a photosensitive element positioned to receive light reflected from a film surface or shutter surface. A collection lens and a diffusion plate having a plurality of stages of different diffusing characteristics are placed between the reflecting surface and the photosensitive element. The light measuring regions can be changed over as the stages of the diffusion plate are selectively put in the path of the light traveling to the photosensitive element.

5 Claims, 5 Drawing Figures

LIGHT MEASURING DEVICE FOR CAMERA

BACKGROUND OF THE INVENTION

1. Field of the Invention:

This invention relates to light measuring devices for cameras with means making it possible to change over the light measuring area as the reflected light from the film surface or the shutter surface is sensed.

2. Description of the Prior Art:

It is known in the art to provide for the type of light measuring device using the reflected light from the film surface or the shutter surface with means making it possible to change over the light measuring area as disclosed in U.S. Pat. No. 4,180,312.

Such a conventional light measuring area changeover means is constructed in the form of two optical systems arranged ahead of the photosensitive element which systems are selectively inserted into the light measuring optical path thereby changing the light measuring area.

The aforesaid conventional means operates an optical system comprised of lenses placed in front of the photosensitive element, therefore, the provision of three or more interchangeable light measuring areas cannot be made without involving an increase in the complexity of structure.

The aforesaid patent also discloses a technique of preventing the illumination impinging on the photosensitive element from changing as the light measuring area changes by using a gray flat plate or a gray wedge for one of the optical systems. However, when applied to the device having many interchangeable light measuring areas, this technique also creates a large problem, namely controlling the densities of the correspondingly increased number of gray flat plates or wedges.

SUMMARY OF THE INVENTION

It is an object of the present invention to eliminate the above-described drawbacks and to provide a light measuring device for a camera operating with a photosensitive element which receives light reflected from the film or shutter surface. In front of the aforesaid photosensitive element there are provided a diffusion plate, having a plurality of stages of different diffusing characteristics, and a collection lens. When one stage of the plurality of stages of the diffusion plate is selected and light passing through the selected stage of the diffusion plate is conducted to the aforesaid photosensitive element, it is made possible to change over the light measuring area while still preserving a simple structure.

This and other objects of the invention will become apparent from the following description of the embodiments thereof.

DESCRIPTION OF THE PREFERRED EMBODIMENT

The present invention will next be described in connection with an embodiment thereof by reference to the drawings.

Figure 1:
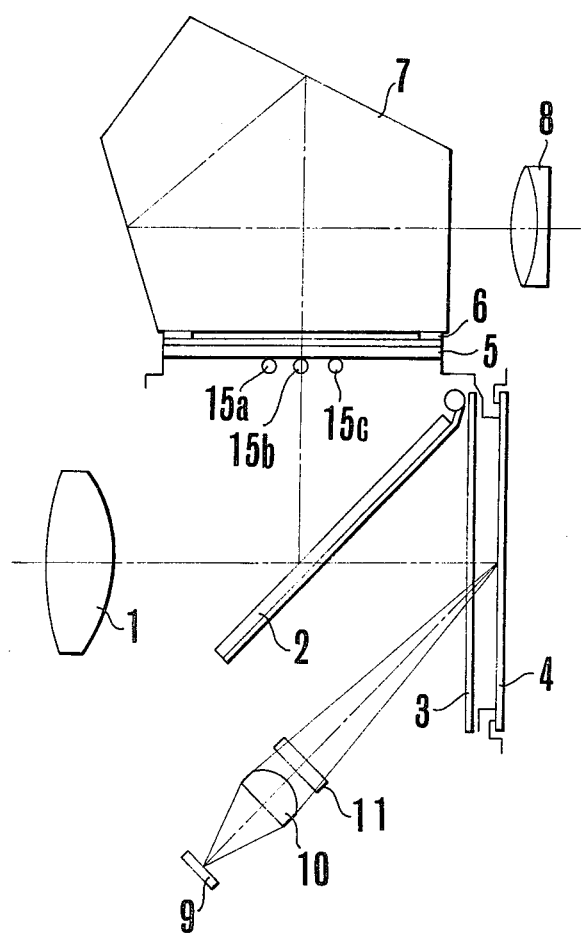
FIG. 1 is a sectional view, as seen from the side of the camera, of a light measuring device in a camera employing one embodiment of the present invention.
Figure 2:
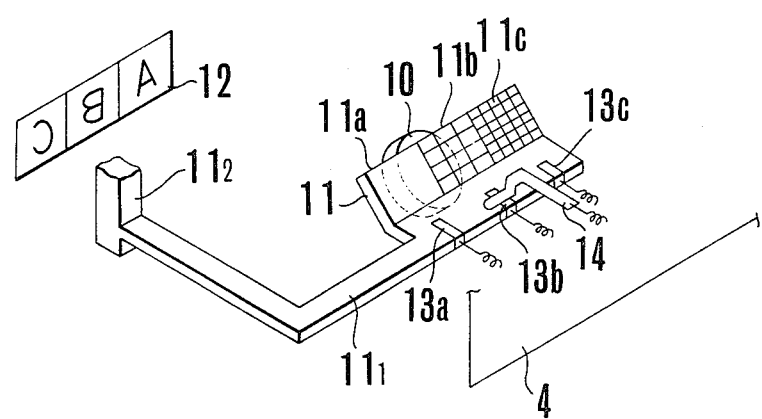
FIG. 2 is an enlarged perspective view illustrating the details of the diffusion plate of FIG. 1.
Figure 3:
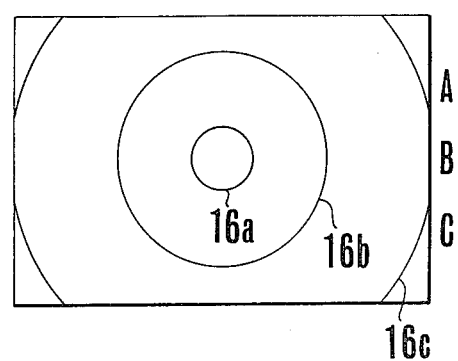
FIG. 3 is an enlarged plan view of the three different light measuring areas in the viewfield of the finder of FIG. 1.
Figure 4:
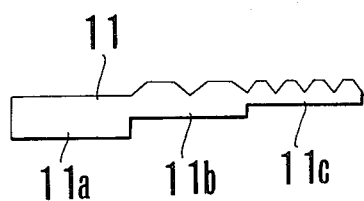
FIG. 4 is an enlarged sectional view of the diffusion plate shown in FIG. 1.

FIG. 1 illustrates an arrangement of the various parts of the light measuring device of the invention in a single lens reflex camera including an objective lens 1; a pivotal mirror 2; a shutter 3; a film 4; a focusing screen 5; a field mask 6; a penta prism 7; and an eye-piece 8. A photosensitive element 9 is positioned on the bottom of the mirror box, outside the light path leading to the film 4, to receive light reflected from the surface of the film 5 or from the surface of the shutter 4. A collection lens 10 is positioned in front of the photosensitive element 9 with its shorter conjugate point at the element 9. A diffusion plate 11 having, for example, three stages each having different diffusion characteristics is arranged in front of the collection lens 10 and is stepwise movable so that the stages are selectively put into axial alignment with the collection lens 10. As illustrated in FIGS. 2 and 4, a 1st stage 11a of this diffusion plate 11 is flat on both the incidence and emergence sides thereof, a 2nd stage 11b has as its incidence side a diffusion surface constructed with a large number of minute prisms in a matrix array and its emergence side is flat, and a 3rd stage 11c has as its incidence surface a strong diffusion surface constructed with a matrix array of an increased number of smaller prisms and its emergence surface is flat. The diffusion plate 11 is formed with its different diffusing stages in the 1st, 2nd and 3rd stepwise sections 11a, 11b and 11c, and the diffusion plate 11 is further provided with a support member $11_1$ for the diffusing portion and an operating member $11_2$. By moving this operating member $11_2$ manually, any one of the sections 11a, 11b or 11c can be positioned in axial alignment with the collection lens. Placing the 1st stage 11a in axial alignment with the collection lens 10 results in a spot-measuring mode. When the 2nd stage 11b is in axial alignment with the collection lens 10, a centerweighting light measuring mode results. When the 3rd stage 11c is in axial alignment with the collection lens 10, an average measuring mode results. A display panel 12, on the front wall of the camera housing, has three letters "A", "B" and "C". When the control knob $11_2$ is placed in the registry marked "A", the spot measuring mode is selected. When placed in the registry marked "B", the centerweighting light measuring mode is selected. When placed in registry marked "C", the average measuring mode is selected. The support member $11_1$ is provided with electrically conductive patches 13a, 13b and 13c which contact a slider 14 in such a manner that the control knob $11_2$ settings A, B and C, indicated on the display plate 12, correspond to the slider 14 contacting patches 13a, 13b and 13c respectively. A corresponding light-emitting diode 15a, 15b or 15c is energized. Light from this energized diode 15a, 15b or 15c illuminates a corresponding mark "A", "B" or "C" near the margin of the viewfield of the finder as illustrated in FIG. 3. Three concentric circles 16a, 16b and 16c of different diameters are printed on the focusing screen 5 and indicate in the finder field the respective light measuring areas.

The longitudinal section of the diffusing stages of the aforesaid diffusion plate 11 has a shape which is illustrated in FIG. 4. In more detail, the axial thickness of the 1st, 2nd and 3rd stages, 11a, 11b and 11c is made progressively thinner, so that the transmittances of the 1st, 2nd and 3rd stages 11a, 11b and 11c are caused to differ from one another when the diffusing portion of the diffusion plate is formed by using a common resin colored to gray. With the axial thicknesses in correct relation to the required values of density for the stages 11a, 11b and 11c, variations of the illumination on the surface of the photosensitive element can be limited to zero or thereabout as the diffusing characteristic changes.

Figure 5:
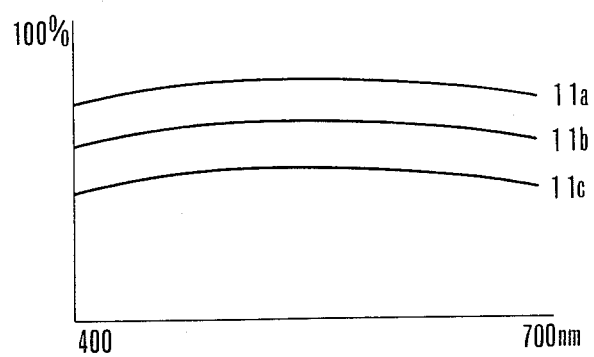
FIG. 5 is a graph of the spectral transmittances of the stepwise sections of the diffusion plate of FIGS. 2 to 4.

FIG. 5 illustrates the spectral transmittances of the 1st through 3rd stages, 11a through 11c, of the diffusing stages. Because the 1st through 3rd stages are made of the same material the transmittance varies, with variation of the wavelength, at the same rate for each of the stages 11a to 11c. It is evident that as the measuring mode changes, the deviation of the light value from a true value, resulting from a change of the spectral characteristic, can be extremely minimized.

The operation of the camera of such construction is as follows: First, an explanation is given in connection with the spot measuring mode.

When the control knob $11_2$ is moved to the registry marked "A" on the display plate 12, the 1st stage 11a of the diffusion plate 11 is in front of the collection lens 10. At the same time, the slider 14 is in contact with the conductive patch 13a so that a circuit (not shown) energizes the 1st light-emitting diode 15a. Then, the photographer looking into the finder through the eye-piece 8 can observe an image of the object to be photographed on the focusing screen 5, as light coming from the object through the objective lens 1 is reflected from the pivotal mirror 2 to the focusing screen 5 and the image radiates light which passes through the penta prism 7 and the eye-piece 8 reaching the eye of the photographer. Since, at this time, the 1st light-emitting diode 15a is energized, the photographer will read the letter "A" in the finder and will recognize that the light measuring device is responsive to the area enclosed within circle 16a.

When the shutter button is depressed to initiate an exposure operation, the pivotal mirror 2 is flipped upwards to clear the path for the image forming light beam coming from the objective lens 1 to the shutter 3, from the surface of which the light beam is reflected. Then, the shutter is opened and the image bearing beam from the objective lens 1 is focused on the film 4 and reflected therefrom. The light reflected from the shutter surface followed by light reflected from the film surface passes through the 1st stage, 11a, of the diffusion plate 11 to the collection lens 10 which focuses it on the photosensitive element 9. After a duration of a time controlled by the output of this photosensitive element, a control circuit (not shown) carries out the shutter closing operation.

In order to switch the camera to the centerweighting light measuring mode, the control knob $11_2$ is moved to registration marked "B" on the display plate 12, thereby the 2nd stage 11b of the diffusion plate 11 is placed in front on the collection lens 10. At the same time, the slider 14 is moved from the 1st conductive patch 13a and comes in contact with the 2nd conductive patch 13b, thereby, the 2nd light-emitting diode 15b is energized. Upon looking through the finder, the photographer is informed, by reading the letter "B", of the fact that the light measuring device is responsive to the area enclosed within circle 16b.

Then, as the depression of the shutter button initiates an exposure, the light reflected from the shutter surface and the film surface passes through the 2nd stage, 11b, of the diffusion plate 11 and is collected on the photosensitive element 9 after being focused by the collection lens 10. The exposure of the film is controlled in accordance with the output of this photosensitive element.

The next explanation is for the average light measuring mode. When the control knob $11_2$ is moved to the "C" position on the display plate 12, the 3rd stage, 11c, of the diffusion plate 11 is placed in front of the collection lens 10, and at the same time the 3rd light-emitting diode 15c is energized when the slider 14 contacts conducting patch 13c. Therefore, a photographer looking through the finder is informed that the light measuring device is responsive to the area in circle 16c.

Then, when the shutter button is depressed, the light reflected, first from the shutter surface and then from the film surface, enters the 3rd stage, 11c, of the diffusion plate 11 and proceeds through the collection lens and into the photosensitive element 9. The output of this photosensitive element controls the exposure.

It should be understood that in order to change the light measuring mode the diffusion characteristic of the part of the diffusion plate, which lies in the light measuring path, must also be changed. This leads to a change in the illumination of the light receiving surface of the photosensitive element for a constant illumination on the film surface. According to the present invention the relative thickness or density of each of the stages of the diffusion plate is the only factor which is required to be accurately determined, thereby, it is made possible to facilitate an extreme minimization of the change of the illumination of the photosensitive element which change results from the change of the diffusion characteristic.

Though the foregoing embodiment has been described in connection with light reflected from the shutter surface and the film surface, it is also possible to use light reflected from a reflector positioned near the shutter surface specifically for the purpose of light measurement.

Instead of using a matrix array comprised of a great number of prisms in the diffusion plate, it is also possible to use a diffusion surface of an irregular concave and convex form to effect an equivalent result.

Further, if it is not desired to define the light measuring area as the center of the picture but to put an emphasis slightly away from center, a great advantage is produced because there is only need to manufacture the diffusion plate in a wedge-like or similar shape so that a directional property is added to the diffusion characteristics.

As has been described above, according to the present invention, in the so-called TTL light measurement, the number of light measuring aspects can be remarkably increased without causing an unduly large increase in the complexity of structure and without involving an increase in the complexity of the electrical signal processing circuit which would otherwise result.

What I claim is:
1. A light measuring device for a camera comprising:
  (a) light sensitive means for measuring a reflected light from a shutter surface or a film surface;
  (b) a collection lens positioned in front of said light sensitive means, said collection lens conducting said reflected light to said light sensitive means;

(c) diffusing means provided with a plurality of diffusing portions, having different diffusing characteristic and different light measuring ranges, said diffusing means being movable so that one of the plurality of diffusing portions is positioned in front of said light sensitive means, whereby one of the diffusing portions which lies in front of the light sensitive means and said collection lens in combination conducting said reflected light to said light sensitive means;

(d) changeover means for replacing one of the diffusing portions positioned in front of said light sensitive means by another diffusing portion;

(e) each diffusing portion of said diffusing means being colored, and having its color density and its thickness in a specific relation so as to minimize changes in the brightness of the light receiving surface of said light sensitive means when the diffusion characteristic is changed;

(f) switch means comprising a plurality of electric contacts and a sliding element which contacts one of said electric contacts, the number of said electric contacts corresponding to the number of said diffusing portions and said electric contacts being formed integratedly on the corresponding diffusion portions; and (g) indicating means having a plurality of indicating portions which correspond to said diffusing portions and indicate light measuring ranges of the corresponding diffusing portions.

2. A device as described in claim 1, wherein said diffusing portions are arrays of a great number of prisms.

3. A device as described in claim 1, further including: display means for displaying a light measuring area in a finder.

4. A light measuring device for a camera comprising:
(a) light sensitive means for measuring light passing through an objective lens;
(b) a collection lens positioned in front of said light sensitive means, said collection lens conducting said passed light to said light sensitive means;
(c) diffusing means provided with a plurality of diffusing portions having diffusing characteristics different from one another, said diffusing means being movable so that one of the plurality of diffusing portions is positioned in front of said collection lens and one of the diffusing portions which lies in front of said collection lens and said collection lens in combination conducting said passed light to said light sensitive means;
(d) changeover means for replacing one of the diffusing portions positioned in front of said light sensitive means by another diffusing portion, said means performing changing over of the light measuring area;
(e) each diffusing portion of said diffusing means being colored, and having its color density and its thickness in a specific relation so as to minimize changes in the brightness of the light receiving surface of said light sensitive means when the diffusion characteristic is changed;
(f) switch means comprising a plurality of electric contacts and a sliding element which contacts one of said electric contacts, the number of said electric contacts corresponding to the number of said diffusing portions and said electric contacts being formed integratedly on the corresponding diffusion portions; and
(g) indicating means having a plurality of indicating portions which correspond to said diffusing portions and indicate light measuring ranges of the corresponding diffusing portions, said indicating means indicating one of the indicating portions as one of the diffusing portions is arranged in front of the light sensitive means and the electric contact corresponding to said one of the diffusing portions contacts the sliding element.

5. A device as described in claim 4, further including: display means for displaying said light measuring area in a finder.

* * * * *